United States Patent [19]

Huelsman et al.

[11] 4,212,072

[45] Jul. 8, 1980

[54] DIGITAL SCAN CONVERTER WITH PROGRAMMABLE TRANSFER FUNCTION

[75] Inventors: Kenneth A. Huelsman, Carlsbad; Allen A. Harano, Oceanside, both of Calif.

[73] Assignee: Hughes Aircraft Company, Culver City, Calif.

[21] Appl. No.: 884,327

[22] Filed: Mar. 7, 1978

[51] Int. Cl.² .................... G06F 15/20; H04N 5/14
[52] U.S. Cl. .......................... 364/515; 358/112; 358/166; 358/167
[58] Field of Search .............. 364/515; 358/112, 166, 358/167; 73/618, 619, 620

[56] References Cited

U.S. PATENT DOCUMENTS

| | | | |
|---|---|---|---|
| 3,800,078 | 3/1974 | Cochran et al. | 358/166 X |
| 3,920,889 | 11/1975 | Connor | 358/166 |
| 3,961,133 | 6/1976 | Bennett | 340/324 AD X |
| 4,058,001 | 11/1977 | Waxman | 358/112 X |
| 4,058,836 | 11/1977 | Drewery et al. | 358/167 |

| | | | |
|---|---|---|---|
| 4,099,179 | 7/1978 | Hofstein | 358/112 X |

*Primary Examiner*—Jerry Smith
*Attorney, Agent, or Firm*—Walter J. Adam; W. H. MacAllister

[57] ABSTRACT

A digital scan converter is provided with a programmable transfer function for video display of picture elements (pixels) using a main random access memory for storing a pixel array to be read out periodically for display, and to be selectively read out while scanning for updating with a value derived from an auxiliary random access memory addressed by the composite of an old pixel value to be updated and the new pixel value. Each memory location of the auxiliary memory stores a value derived from a table defining the transfer function desired for the entire range of new and old pixel values. An alternate transfer function is stored in a second block of the memory and selectively called out by a prefix set to a 1 or 0 in the most significant bit position of the composite address word.

6 Claims, 5 Drawing Figures

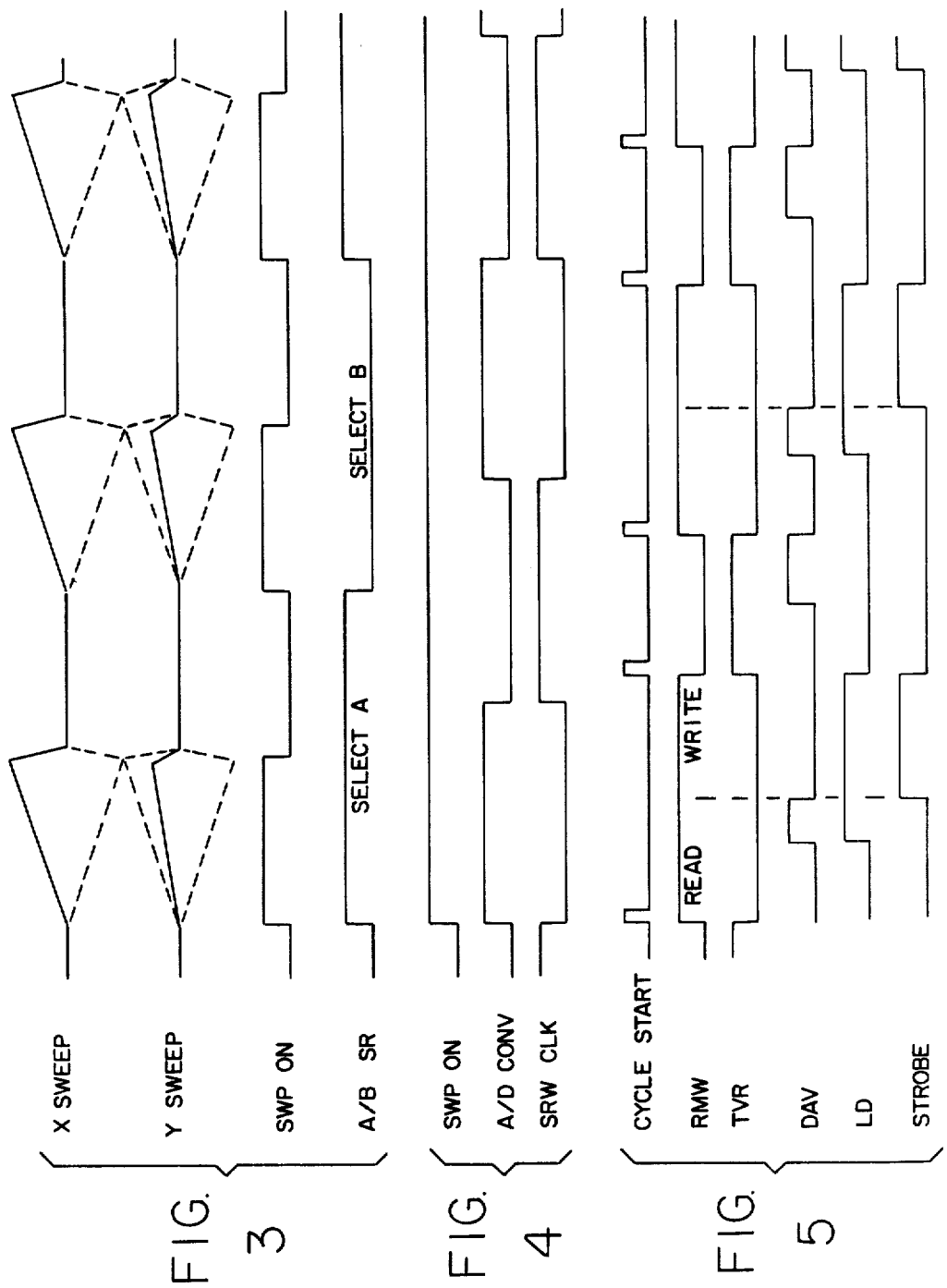

DIGITAL SCAN CONVERTER WITH PROGRAMMABLE TRANSFER FUNCTION

BACKGROUND OF THE INVENTION

This invention relates to a digital scan converter, and more particularly to techniques for updating display data in a digital scan converter with a selected characteristic in respect to peak detection capabilities in order to emulate the operation of an analog scan converter.

Electrostatic storage tubes have been widely used for scan conversion memory. Typical is the type H-1269A scan converter tube manufactured by Hughes Aircraft Comapny and used in a model 639 scan conversion memory also manufactured by Hughes Aircraft Corporation. That analog scan conversion memory has been used in such applications as ultra-sound imaging for medical diagnosis as well as many non-medical applications.

The key component of the analog scan conversion system is, of course, the scan converter tube which is essentially a cathode ray tube operated in a manner analogous to a conventional picture tube, except that the electron beam is directed toward a charge-storage target rather than a phosphor viewing screen. During the WRITE mode, the electron beam is driven in a vector scan mode corresponding to the signal source and is modulated in accordance with a video input signal so that local charges, proportional to beam intensity, are deposited on the storage target at discrete memory locations. In the READ mode, the beam (unmodulated) scans the storage target in a conventional interlaced raster mode. As the unmodulated beam scans, target output current varies with the charge pattern.

In the ultrasonic imaging application, as in other applications, it is necessary to process the video signal from a transducer before entering it into the scan conversion memory. The processing includes peak detection for each picture element (pixel) which, if displayed with other peak detected pixels, may present a rather "harsh" picture with significant noise. The scan converter tube does not store the peak detected pixels at full value but rather with a transfer function characteristic of the tube which is about 90% of the detected peak value on the first scan and about 100% on about the tenth scan over the same pixel. The result is inherent filtering of noise and softening of the picture displayed. This has been very helpful to medical doctors in ultrasonic imaging of body tissue for diagnostic analysis. It would therefore be important to the medical doctors skilled in the use of this diagnostic technique to always have a system with the same display characteristic. Therefore any digital scan converter should have the same transfer function characteristic as the analog scan converter tube for applications such as ultrasonic diagnostic analysis. However, for other applications it may be desirable to have some other transfer function, such as 70% on the first scan, an increase of 70% of the difference on each subsequent scan of greater value, and a decrease of 20% on each subsequent scan of lower value. And in some cases, it may be desirable to temporarily scan with a 100% transfer function for a "hard" picture, such as while trying to enhance some detail in the softened picture.

OBJECTS AND SUMMARY OF THE INVENTION

An object of this invention is to provide an improved digital scan converter with virtually any transfer function characteristic.

A further objective is to provide a digital scan converter with the facility for selecting any one of a plurality of transfer function characteristics.

These and other objects and advantages of the present invention are achieved in a digital scan converter comprised of means for converting video signal samples while scanning to form picture elements (pixels) in a fixed scan coordinate system, means for storing pixel values in a coordinate system corresponding to the fixed scan coordinate system, and means for comparing the value of each video signal sample in digital form with the last pixel value stored for the same point in the fixed scan coordinate system to determine the value to be stored in the memory means in place of the last pixel value in accordance with a predetermined function programmed into the comparing means. As a further feature of the invention, the comparing means is programmed with a plurality of functions, and includes means for selecting one of the functions in response to setting of an operator's console switch.

In a preferred embodiment, the pixel storage means is comprised of a read-modify-write random access memory addressed by the scan conversion system in the read-modify-write mode with the coordinates of each pixel to be updated, and addressed by a video display system in the read mode on a time sharing basis. While on the read-modify-write mode, the output of the memory thus provides a pixel value for comparison with an incoming sample value for the same pixel. The comparison means is preferably implemented with a memory addressed by the composite of the old and new pixel values. The proper value for the updated pixel value is stored in memory for each unique composite value from a table which defines the desired transfer function. A plurality of such transfer function tables may be stored in different blocks of the memory and selectively called out by additional address bits provided as a prefix to the most significant bit of the composite update memory address word (old and new pixel values) through a selection switch.

The novel features that are considered characteristic of this invention are set forth with particularity in the appended claims. The invention will best be understood from the following description when read in connection with the accompanying drawings.

BRIEF DESCRIPTION OF THE DRAWINGS

FIGS. 3, 4 and 5 are waveform timing diagrams useful in understanding the operation of the embodiment illustrated in FIG. 2.

DESCRIPTION OF PREFERRED EMBODIMENTS

Figure 1:
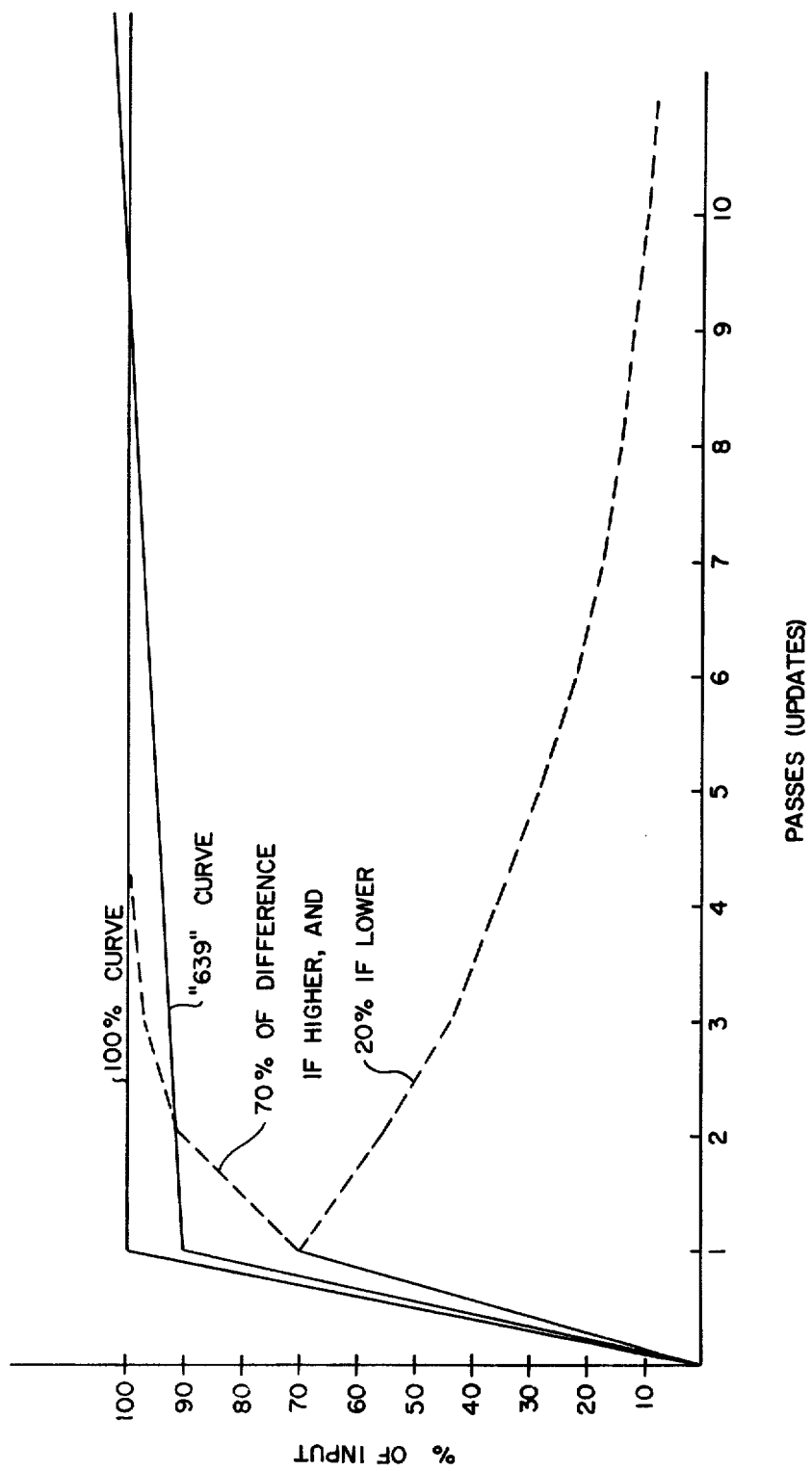
FIG. 1 is a graph illustrating exemplary transfer functions for the present invention.
Figure 2:
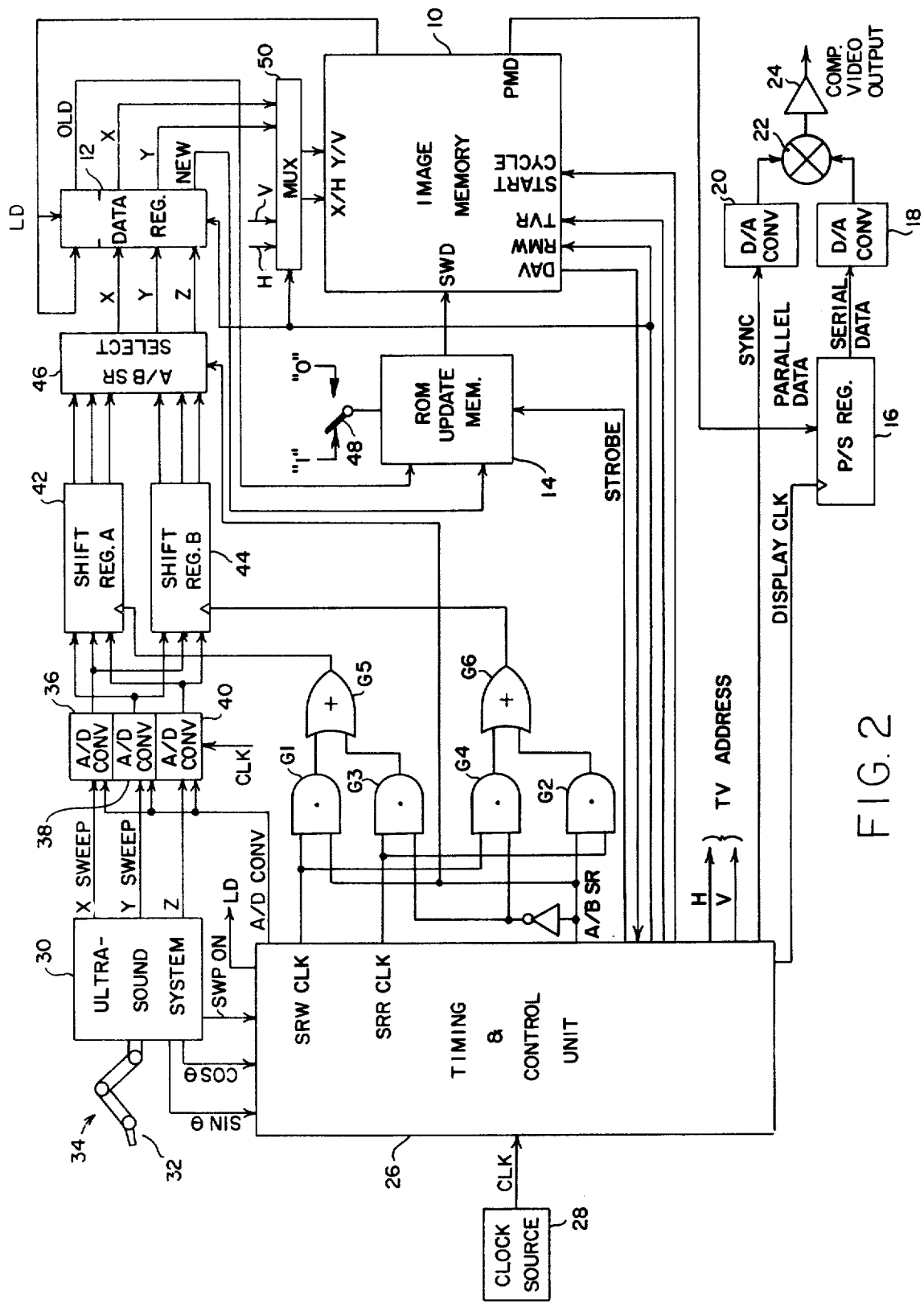
FIG. 2 illustrates an exemplary embodiment of the invention.

Before describing a preferred embodiment of a programmable transfer function for a digital scan converter, exemplary transfer functions will be discussed in more detail with reference to FIG. 1 which shows graphically three transfer functions: a 100% transfer functions; a "639" transfer function; and a 70–20% transfer function. These are but three exemplary transfer functions. The system to be described with reference to FIG. 2 will permit virtually any transfer function for scan conversion of a video frame, pixel by pixel, in an array of pixels in rows (preferably interlaced odd and even rows) and columns. Scan conversion is required where, as in ultrasonic scanning the cross section of a body organ in vivo, the probe is "looking" along many different vectors not aligned with the X and Y display axis as the operator of the ultrasound system scans the entire cross section.

In scan conversion with a 100% transfer function, each pixel at a unique X-Y address is to be displayed with the full (100%) intensity sensed on the first pass, so the scan converter passes the pixel values unaltered. It sometimes happens that a pixel value will be higher when scanned from a different point of view. In that event, the higher value received replaces the old value stored in the digital scan converter for the pixel at that X-Y address. Operation in the 100% transfer function mode provides the scan converter with peak detection capabilities. Display in this mode is what has been referred to hereinbefore as display of a "hard" picture.

In the "639" transfer function mode, the digital scan converter emulates the performance of the type H-1269A scan converter which employs a model 639 analog scan converter tube. In this mode, a point scanned for the first time will go from Zero to 90% of the pixel value, and each time thereafter it will be increased 10%. This transfer function characteristic of a 639 scan converter tube is very useful because, in an ultrasound system there is random noise in each pixel return. If displayed at 100%, the pixel would always include all of the noise present. But if displayed at 90% plus 10% for each subsequent scan, a pixel value more nearly free of noise will be developed. This is because noise is random so that it will not be present on each scan.

Still another mode which may be useful is, as suggested hereinbefore, a 70–20%. This is represented by the third curve in the graph of FIG. 1. In this mode the first scan increases a pixel from zero to 70% of the pixel value, and thereafter increases it by 70% of the difference if the pixel value is higher than the recorded value of the last scan and decrease it by 20% of the difference if the pixel value is lower. Still other transfer functions can be defined where the new value to be recorded after the first is a function of the new pixel value and the old pixel value. This can be implemented using a read only memory (ROM) to store a conversion table where, for the first scan of a pixel, the old value will be zero, and for each subsequent scan a value which depends upon the new pixel value and the old pixel value. Alternatively, this can be implemented with a random access memory (RAM) to facilitate altering the transfer function characteristic of the system for different applications.

To change transfer functions, it is a simple matter to change the programmed ROM, either by replacement or by switching memory sections. In the latter case, it is preferable to provide sufficient memory capacity to store two, or more, conversion tables. A selection switch in one position provides a bit, or bits, in the most significant end of the address words for one block of memory storing a table for one mode, and in another position for another block of memory storing a table for another mode. Each pixel scanned at an X-Y address will cause an old pixel value to be read from a digital scan converter memory 10 denoted in FIG. 2 as in an image memory. This old value is latched in the upper part of a data register 12 and used as part of an address for a read only memory 14. A new pixel value latched in the lower part of the register 12 is used as the other part of the ROM address. The output of the ROM is the updated value which is then stored in the same X-Y pixel location of the image memory as read for the old pixel value. The image memory is thus updated as a scanning system scans to provide new pixel values along any vector in the X-Y plane to be compiled in the image memory for display.

The image memory is time shared with a display system comprised of a parallel-to-serial converting register 16 and a video digital-to-analog converter 18. For TV display, the pixels are read from the image memory into the register 16 one row at a time in parallel, and read from the register pixel by pixel, each pixel comprising a N-bit number converted to an analog video signal. A synchronized digital-to-analog converter 20 receives periodic sync signals in digital form for conversion into video sync signals which are combined with video data through a mixer 22 and amplifier 24 to provide a composite video output signal for display. The display clock pulses and the sync signal applied to the register 16 and the D/A converter 20, respectively, are generated by a timing and control unit 26 which is driven by a high frequency clock source 28 to generate these and other timing signals to be described, all in a conventional manner employing digital clock pulse counters and logic gates.

To describe the invention in a specific exemplary embodiment, an ultrasound scanning system 30 will be assumed. It employs a probe 32 on an articulated arm 34 to provide X and Y sweep (ramp) signals and an analog intensity (Z) signal. The slope of the X and Y sweep signals will depend upon the vector of the ultrasound scan for each sweep. For example, if the vector is along the X axis, the Y sweep signal will have a zero ramp, but if it is at an angle $\theta$ with respect to the X axis, the ramps will be a function of the sine and cosine of the angle. The X and Y sweep signals are converted to digital form, along with the Z signal to provide the X and Y addresses of pixel values (samples of the Z signal). To accomplish that, analog-to-digital converters 36, 38 and 40 are periodically commanded by the unit 26 with a signal A/D CONV to sample, hold and convert the Z-axis signal and its X and Y sweep values. One complete scan is stored in a first (A) input register 42 at one rate (SRW CLK), which is a function of the vector angle, for later processing at a fixed rate (SRR CLK) selected for time sharing of the image memory 10 with the display system. While the data in the first input register is being processed, a second (B) input register 44 is used to store data.

Each pixel value stored in the input registers is stored as an N-bit word. Consequently each input register has a parallel N-bit input and a parallel N-bit output. Assuming N is equal to 4 for a 16 level video display system, each shift register is in actuality X+Y+4 shift registers operated in parallel: X shift registers for the X address, Y shift registers for the Y address and 4 shift registers for the value of each pixel in a sweep. All data and address signals from the A/D converters 36–40 through, to and out of the memories are parallel binary coded signals.

Two sets of gates are controlled by a shift register select signal (A/B SR) to alternately write and read data into and out of the shift registers. While a gate G1 is enabled to write in register A, gate G2 is enabled to read out of register B. This is while the A/B SR signal is high. While it is low, gates G3 and G4 are enabled to read from the register A and write in the register B. Gates G5 and G6 are OR gates to transmit clock pulses from either set of enabled AND gates. The read clock rate is selected to be compatible with the update mode of operation for the image memory, and the write clock rate is controlled by the unit 26 as a function of the vector angle $\theta$. If that angle were to be constrained by the ultrasound system to be constant, such as zero for a vertical sweep with X only incrementally changed before each sweep and Y a ramp signal of constant slope, then the write clock rate would also be constant, but that would require aiming the probe parallel to the Y axis at all times and moving it only in the X axis to scan a cross section of the subject. However, it is not intended that the present invention be limited to an ultrasound system so constrained, nor to an ultrasound system. It could well be used in any system for converting from one scan rate and/or orientation to another scan rate and/or orientation.

As each new pixel value is to be read out of register A or B, via a bank of select gates 46, the data register 12 receives a read-modify-write (RMW) pulse and a latch data pulse (LD) to enter a multi-bit word. Assuming a 9-bit X and a 9-bit Y address, the word will consist of 18 address bits, 4 bits for a new pixel value, and 4 bits for an old pixel value, a total of 26 bits. The RMW pulse latches the X and Y address bits in the data register, and the LD pulse latches the old data read from the image memory at the latched address and the new data out of the selected register. The old and new data comprise the address word necessary to address the ROM to update the pixel address at the latched X and Y address. Following that a strobe pulse is applied to the ROM to read out a single word of data (SWD) into the image memory in place of the old pixel value read out.

The SWD for the particular old and new values is predetermined and stored in the ROM in accordance with the transfer mode selected. If more than one transfer mode is to be provided for selection, such as the 100% mode and the "639" mode, a switch 48 provides the most significant bit of the ROM address. In the case of providing for only two modes, the switch will produce a bit 1 to address one half of the ROM for one mode and a bit 0 to address the other half of the memory for the alterante mode. Each half stores a complete transfer function table which yields a unique SWD for every combination of $2^N$ values of old and $2^N$ values of new data. Where N=4, the table will be a 16 by 16 table.

The operation just described for updating the image memory with a predetermined transfer function will be better understood from the following description of controlling waveforms. FIG. 3 illustrates the X and Y sweep signals produced by the ultrasound system 30 while a sweep-on (SWP ON) signal is high. The slopes of these sweep signals may vary according to the scan vector angle $\theta$, but the period of each sweep is constant. The timing and control unit 26 counts the sweep-on periods, as by a simple flip-flop, and enables a gate to transform every other one of the sweep-on pulses as a signal AB SR to alternately select the A and B registers. While the sweep-on signal is high, the timing and control unit generates A/D converter command pulses from clock pulses, one command pulse for each pixel as a function of the scan vector angle. The high frequency clock pulses (CLK) are applied to the converter to synchronously convert each sample to digital form for storing in a shift register before another sample is taken. The A/D converter command pulses are shown in FIG. 4, using an expanded time scale, together with the shift register write clock (SRW CLK). The shift register read clock (SRR CLK) is independent of these signals in frequency, and therefore is not shown.

The image memory control sequence will now be described with reference to FIG. 5. A start cycle pulse synchronized with a shift register read clock initiates a read-modify-write (RMW) signal, and both are applied to the image memory for a sequence during which the old pixel value is read and used to address the ROM as described above to obtain a new pixel value to replace the old in the image memory. Once the old value is read out of memory, a data available (DAV) pulse is produced by the memory to initiate a latch data (LD) pulse out of the unit 26. The read cycle is complete at the end of the DAV pulse, and the write cycle begins. During the read cycle, and near the end when the ROM address inputs have stabilized, the control unit 26 generates a strobe pulse to read out the update value for the pixel from the ROM. The strobe pulse terminates at the end of the read-modify-write pulse, at which time the single word of data (SWD) out of the ROM is stored in the image memory (at the address latched into the register 12 at the beginning of the read-modify-write pulse) to complete an update cycle for one pixel. The control unit 26 then generates another cycle start pulse and a TV read signal (TVR) which lasts for a period sufficient to address and read out in parallel 16 successive pixels for TV display. Then another read-modify-write cycle is initiated. The addresses for the image memory during the TVR cycle is provided as horizontal and vertical (H and V) 9-bit words by the unit 26 via a multiplexer 50. The read-modify-write (RMW) signal switches that multiplexer back to the register 12 for the next pixel update cycle. During the next RMW cycle, the 16 pixels read in parallel into the register 16 are read out in sequence for display.

This digital scan converter provided with a programmable transfer function for video display is useful for other operations analogous to the peak deviation operation described. It could be used for integration or summation of pixel values on successive passes, for differencing or subtraction of pixel values, for averaging of pixel values or for a controlled fade of pixel values, such as by summing successive pixel values, each time dividing by some chosen number, or combinations of these with differing programs depending upon the level of the video signal. Examples might include varying the peak detection efficiency as a function of the amplitude of the signal, or summation for low level signals with peak detection for higher level signals of varying efficiency. Still other examples might require looking at not only the pixel to be updated but also the surrounding pixels to determine the update value. Thus, although a particular embodiment of the invention has been described, it is recognized that modification may readily occur to those skilled in the art. Consequently, it is intended that the claims be interpreted to cover such modifications and equivalents.

What is claimed is:

1. A method for processing video data in digital form, and storing it in an image memory for subsequent display, where the video data is developed by repeated scans and presented in the form of scan signals defining scan coordinates of picture elements, and a pixel value for each picture element, the steps of

- reading out of said image memory pixel values at locations corresponding to said scan coordinates,
- providing an updated value for each new pixel value to be stored in said image memory from a set in an update memory as a function of (1) at least one old pixel value read out of said image memory at a location to be updated as defined by said scan coordinates, and (2) a new pixel value for the corresponding scan coordinates, said set having an appropriate updated value for every combination of an old pixel value and a new pixel value stored in an update memory location defined by a composite word including the combination of the old and new pixel values and at least one additional bit of greater significance,
- selecting said at least one additional bit as a "1" or a "0" to provide for addressing one of said at least two parts of said update memory as a function of said old and new pixel values, each part having a different set of updated pixel values representing a selected transfer function,
- receiving said old pixel value from said image memory and a new pixel value, forming said composite word with said at least one additional bit for addressing said update memory, and reading out an updated pixel value, and
- storing said updated pixel value in said image memory at a location addressed by said scan coordinates corresponding to said new pixel value and previously used to address said image memory to read out said old pixel value.

2. The method of claim 1 including the step of reading out in parallel groups of adjacent pixel values stored in said image memory for display between processing cycles for incoming scans of video data, whereby video data is continually updated while it is displayed.

3. In a system for the processing of video data in digital form for subsequent display, where the video data is developed by repeated scans and presented in the form of scan signals defining scan coordinates of picture elements, and a pixel value for each picture element, the combination comprising

- an image memory for reading out pixel values at locations corresponding to said scan coordinates and storing in its place an updated pixel value,
- a pixel value update memory for providing an updated pixel value to be stored in said image memory as a function of (1) at least one old pixel value read out of said image memory at a location to be updated as defined by said scan coordinates, and (2) a new pixel value for the corresponding scan coordinates, said update memory having at least two parts, each part having a different set of updated pixel values representing a transfer function, each part of said update memory having an appropriate updated value for every combination of an old pixel value and a new pixel value with the appropriate updated value stored in an update memory location defined by a composite word including the old and new pixel values and at least one additional bit of greater significance,
- means for selectively setting said at least one additional bit to a "1" or a "0" to provide for addressing one of said at least two parts of said update memory as a function of said old and new pixel values,
- means receiving said old pixel value for said image memory and said new pixel value for being combined with said at least one additional bit to form said composite word for addressing said update memory, thereby to read out an updated pixel value from said update memory, and
- means for storing said updated pixel value in said image memory at a location addressed by said scan coordinates corresponding to said new pixel value and previously used to address said image memory to read out said old pixel value.

4. The combination of claim 3 including means for reading out in parallel groups of adjacent pixel values stored in said image memory for display between processing cycles for incoming scans of video data, whereby video data is continually updated while it is displayed.

5. In a system for processing video data in digital form, and storing said data in an image memory for subsequent display, where the video data is developed by repeated scans and presented in the form of scan signals defining scan coordinates of picture elements, and a new pixel value for each picture element, apparatus for updating data in said image memory with incoming video data according to predetermined transfer functions stored in an update memory, said update memory having at least two parts, each part having a different set of updated pixel values in accordance with a different transfer function, comprising

- means for reading out of said image memory pixel values at locations corresponding to said scan coordinates,
- means for reading an updated value for each new pixel value to be stored in said image memory from said update memory,
- means for receiving said old pixel value from said image memory and a new pixel value as a portion of composite address word, said address word including the combination of old and new pixel values and at least one additional bit of greater significance for addressing said update memory to read out an updated pixel value from said address,
- means for setting said at least one additional bit to a "1" or a "0", and
- means for storing said updated pixel value in said image memory at a location addressed by said scan coordinates corresponding to said new pixel value and previously used to address said image memory to read out said old pixel value.

6. Apparatus as defined in claim 5 including means for reading out in parallel groups of adjacent pixel values stored in said image memory for display between processing cycles for incoming scans of video data, whereby video data is continually updated in said image memory while it is continuously displayed.

* * * * *